Figure 1:
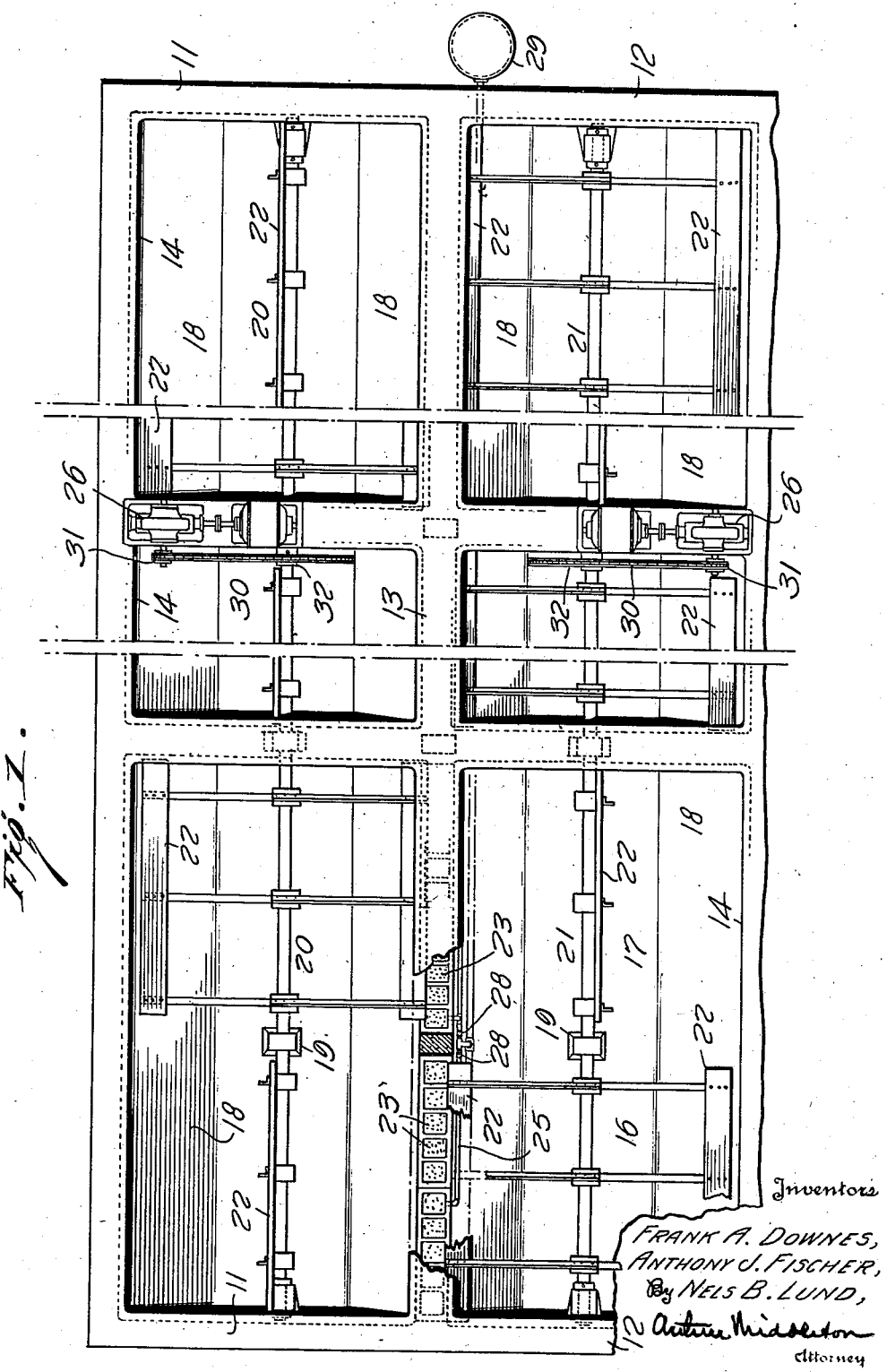

March 19, 1935.  F. A. DOWNES ET AL  1,994,887
SEWAGE AERATION
Filed Dec. 30, 1930  3 Sheets-Sheet 2

March 19, 1935.  F. A. DOWNES ET AL  1,994,887
SEWAGE AERATION
Filed Dec. 30, 1930  3 Sheets-Sheet 3
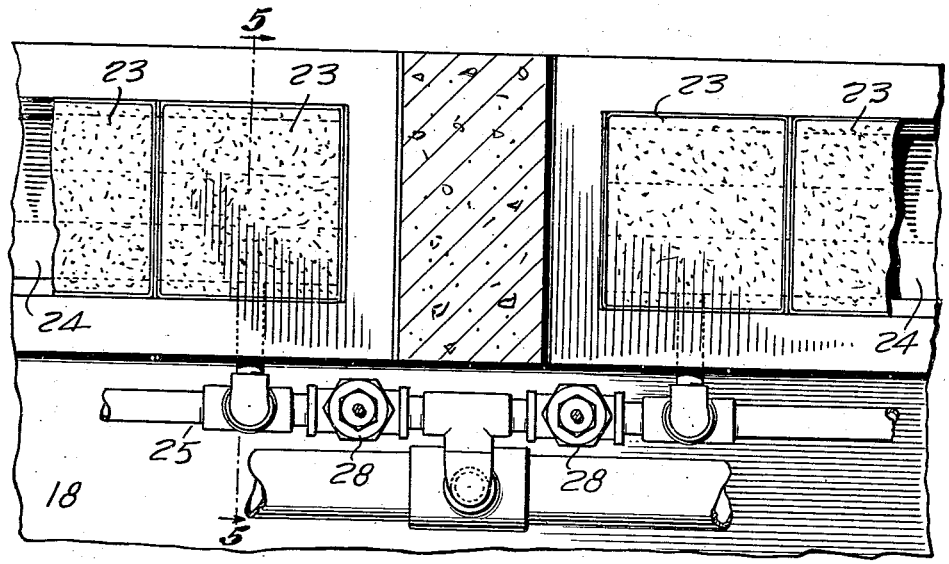
Fig. 3.
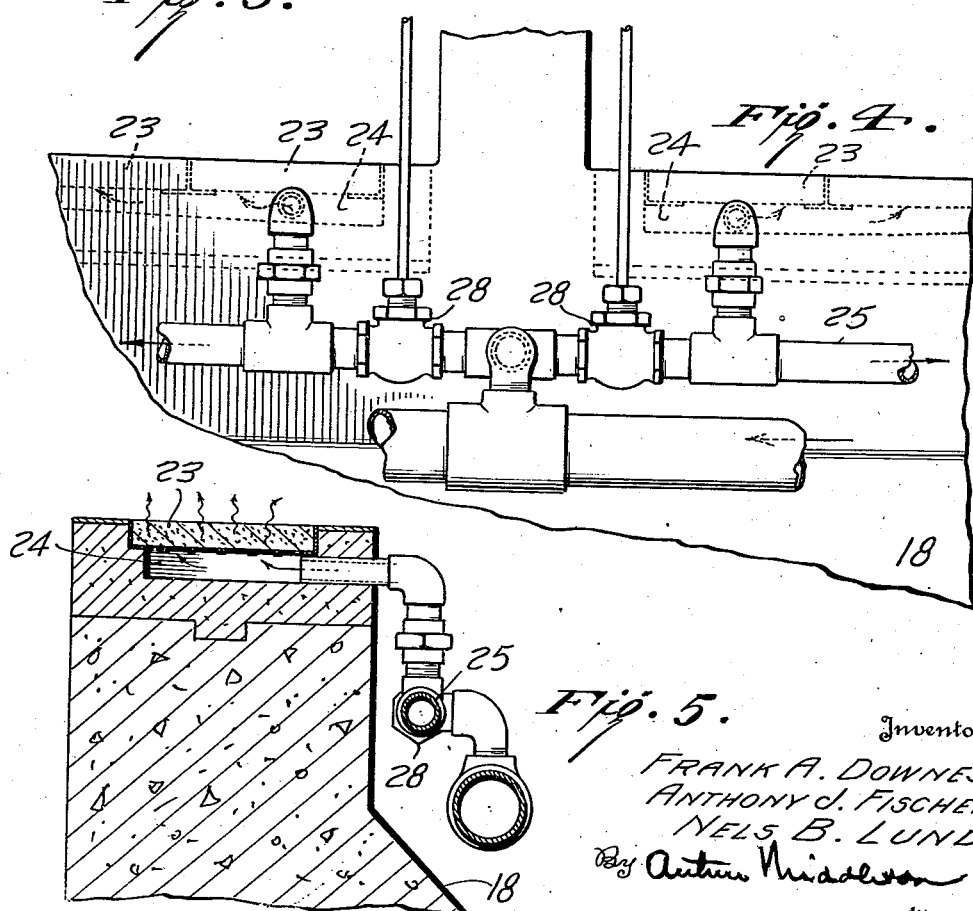
Fig. 4.
Fig. 5.
Inventors
FRANK A. DOWNES,
ANTHONY J. FISCHER,
NELS B. LUND,
By Arthur Middleton
Attorney Patented Mar. 19, 1935

1,994,887

UNITED STATES PATENT OFFICE 1,994,887

SEWAGE AERATION

Frank A. Downes, Larchmont, Anthony J. Fischer, Jackson Heights, and Nels B. Lund, Seaford, N. Y., assignors, by mesne assignments, to The Dorr Company, Inc., New York, N. Y., a corporation of Delaware Application December 30, 1930, Serial No. 505,548

5 Claims. (Cl. 210—8)

This invention relates to the aeration of activated sewage sludge and its object is to produce aeration tanks therefor, which more completely aerate the sewage and which are cheaper to build and operate than heretofore.

To that end, the aim of this invention may be said to be the devising of improvements over the well-known Imhoff sewage aerating tanks by providing one air-emitting arrangement for a plurality of adjacent compartments.

Instead of having the air enter the tank at its bottom, this invention contemplates having it enter a divisional wall common to two adjacent compartments and emerge or emit therefrom at a point intermediate of the top and bottom of the tank. Less air pressure is needed, for the air thus has less liquid head to overcome. Further, by raising the air-outlet, from the bottom of the tank, and having the air-feed lines therebelow, adequate and self-draining means can be provided to eliminate the trouble caused by liquid in the air line when air supply is shut off. This arrangement of piping also permits flushing to eliminate scale therefrom. Also the use of a single pipe for air supply and drainage reduces to a minimum, the amount of pipe that is necessary.

Another improvement is to have the air fed to the sewage through a porous tile plate held in some suitable container. Where small quantities of air are used, drainage of the plate containers into the piping permits even distribution when air is turned on again. No one plate container, by having more trapped liquid therein than another, will offer greater resistance to the renewed air feed than any other.

A still further object is to control the amount of air emitted by each of a plurality of air emitting units so that the air may be localized at any desired point, and so that the amount of air supplied to each emitting means can be tapered off to meet the demand therefor at that particular point whereby power can be saved.

The preferred embodiment of this invention consists in a twin arrangement comprising a tank having two parallel sections, and agitating means in each section, rotating inwardly toward each other. This embodiment offers various features: There is provided an air emitting ridge supplying both compartments with air, thereby doing away with divisional wall and individual air supply for each section. Moreover, a better deflection or distribution of the rising air stream is effected, as there is a more frequent impact of paddles upon the air stream in the twin unit as compared with a single unit. This is important since there exists a certain limited optimum paddle speed which it is not desirable to increase for more intense deflection of the air stream. With the present twin unit the paddle speed is kept at a desirable rate, while the number of paddle impacts upon the rising air stream is doubled.

Other features and advantages will hereinafter appear.

Figure 2:
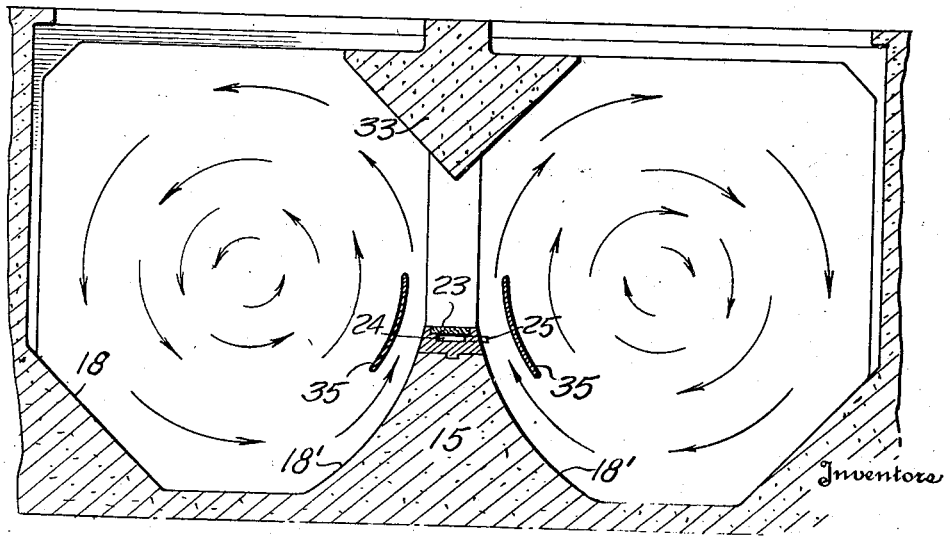

For the purpose of illustration to make the invention clearly understood, drawings accompany this specification in which Figure 1 shows a plan view of our aerating tanks. Figure 2 shows a vertical sectional view through one section of the tank. Figure 3 shows a plan view of the devices of Figure 4. Figure 4 shows a partial sectional view of the air-inlet parts. While Figure 5 is a transverse cross sectional view along the lines 5—5 in Figure 3. Figure 6 shows diagrammatically a modified form of tank section.

From the drawings, it will be seen that there is provided two elongated trough-like tanks 11 and 12, having transverse top beams 13. The tanks 11 and 12, are subdivided into sections such as 14. Each section, of which Figure 2 is typical, has a common dividing wall 15, between each of its units or compartments 16 and 17, which only rises partially to the top of the compartments 16 and 17. That is, its top is intermediate between the top and bottom of the tank compartments.

The corners of the compartments may be suitably filled in as at 18 or to a radius to prevent sludge from collecting therein. 19 represents piers extending upwardly from the compartments 16 and 17, for supporting paddle mechanisms 20 and 21, having blades 22, driven by any suitable means. Paddle means 20 and 21, are for agitating the sludge during aeration, and preferably, although not necessarily, rotate inwardly toward each other.

At the apex of the divisional wall 15, between the two compartments 16 and 17, there, resting in a groove and held in place, is a tile holder or container 23a, having therein one or more porous ceramic tiles such as a "Filtros" tile 23, immediately under which is the air feed outlet 24, connected to the air line piping 25, to which air under pressure is supplied from some source such as the compressor 26, driven by motor 27.

The tile 23 and the associated container 23a may be considered a unit which can be set in place or removed without injuring the tile. In other words this is a porous tile which is armored in a special manner and which can be handled without appreciable danger of injury during shipping, handling, or repair. For instance if the tile is held in place by grouting then the grout can be removed without injury to the tile. The container 23a is in the form of a marginal frame of angular cross section. This frame is fitted over the lower marginal portion of the tile and it may have reinforcing strips 23b placed across the bottom of the tile. Air supply enters through the connection 25 underneath the tile into the air chamber 24.

In describing the piping between the compressor and outlet tile, it should be said that it is desirable to supply the air to each of the sections 14, of one elongated tank, such as 11, from a single source like a compressor or blower. Therefore, the air-line piping 25, running from the compressor or blower which is conveniently located usually in the pump house at a low level, is provided with suitable valves 28, for controlling the amount of air going to each air-outlet 24. This air control is for regulating the volume of emitted air to be in proportion to the oxygen demand of the sewage being treated, and for reducing the air feed during the night when sewage flow drops off.

By closing the valves 28, to the air-emitting outlets 24, a water connection may be made to rise at the end of the piping or main 25, and the main may be flushed with back pressure on the tile plate 23.

Associated with the air-line piping or main 25, is a float operated drainage trap 29, for collecting any excess water accumulating in the air-line. The trap may be operated either automatically or manually.

The motor 27, through a drive unit 26, by means of such connections as a chain 30, and sprockets 31 and 32, is arranged for driving the agitating paddles 20 or 21, or a separate motor may be provided for each paddle.

In operation, sewage is let into the aerating tank at one end thereof and discharges at the opposite end, meanwhile passing progressively through the sections 14. Aeration of the sewage or mixed liquors in the aerating tanks is accomplished by an air-stream at minimum pressure, passing through the air-line 25, issuing under the "Filtros" tile 23, after passing through which it emerges into the sludge in the form of bubbles. In rising, the bubbles encounter the downward moving paddle mechanism 20 and 21, which tend to carry the bubbles downwardly and around with them. That is, the bubbles are thus deflected from their normal upward rising and accordingly are more thoroughly disseminated through its sludge to aerate it. Also the contact period of the air with the sewage is thus increased.

Still another feature lies in the preferred embodiment as shown in Figs. 1 and 2. It covers the staggered arrangement of the paddles of one section relative to the paddles of the other section. A local superposed or what may be called epicycloid movement is imparted to the agitated bulk of the liquid through the staggered paddle arrangement. Swirls are thus caused to operate across the line of air emission for more intense air distribution. Incidentally, the staggered arrangement as shown lowers the power consumption needed for driving the paddles.

An important advantage is secured by not grouting the "Filtros" tile holders or containers into place but by having them merely rest in a groove. Quick repairs may be made by merely loosening one union, lifting out the plate container and replacing with a spare in a few moments.

Should the air supply to the tile 23, be shut off or stopped the tile acts as a filter to prevent any solids from getting into the air line to clog it. However, the tile lets a certain amount of liquid therethrough into the air-line, which drains back into the air-line piping. Any excess of liquid in the air-line piping 25, drains back to the drainage trap 29.

The piping as shown, permits close adjustment of air to individual plate holders, without danger of short-circuiting air. If it should be necessary to use excess air for cleaning the plates, all of the air in the system may be localized at any point with sufficient volume to blow the plates clean.

Also by using the piping system shown, it is possible to taper or graduate the air as required by the mixed liquors or activated sludge in the aeration tanks, keeping the volume at the minimum actually required for biological purposes. Where air alone is used without agitator mechanism, this is not possible since the minimum amount of air required for agitation, to prevent segregation, is always far in excess of that required for biological treatment.

With this system of simplified piping, the liquid in the pipes is displaced by the air in the same pipes, the liquid draining back to a moisture trap or being blown off through a riser at the far end of the tank. If separate air and drainage line were provided, it would be necessary to have additional valve controls to prevent short circuiting of the air through the drainage lines.

In the form shown, there is a decided saving in expense over having compartments 16 and 17, each a separate tank with a separate air-feed and a full height wall instead of the low common dividing wall at 15. And one complete air-emitting device is saved. Moreover, by having the single air-emitter for two units located in the dividing wall 15, above the bottom of the tank, less air-pressure is needed for there is less head of water to overcome, ample space is provided for the air-line piping so that it need not be buried in a trench as is usual now. The advantages of having all pipes exposed is obvious.

Bearing in mind that the prime function of these tanks is to feed air under pressure to the sewage and then agitating or disseminating the air-bubbles through the sewage to thoroughly aerate it, it is possible, under certain conditions, to eliminate the mechanical agitation by the paddles. To that end, a modified form of the invention is shown diagrammatically in which a deflector 33, is provided above the divisional wall 15, so that the air-bubbles emerging from the tile 23, are split by the deflector into two streams as shown by the small arrows which circulate and form eddies which are effective in disseminating the bubbles throughout the sewage mass. As a further modification, there may, or may not, be additionally used, the deflecting plates 35, to further assure the eddying just described.

In the two compartment units, or sections 14, there may be used a paddle agitator such as 20, in one compartment such as 16, while the other compartment of the unit may have the paddles omitted therefrom and the deflector 33, used or vice versa. That is, in one compartment, mechanical agitation may be used, while in its adjacent compartment, liquid stream agitation may be used.

This is suggested for the agitation within the mass when oppositely moving paddles are used is epicyclic; and when similarly moving paddles are used is spiral; whereas the agitation by liquid movement tends more to rotation when only liquid stream is used.

The tendency of the particles in such rotation is to move outwardly tangentially, while the particles in the epicyclic motion tend to move inwardly, so the combination of the two is sometimes desirable for there is a certain amount of movement of liquid from one compartment to the other when these different forms of agitation are used. And this still further hastens aeration. Epicyclic motion of the particles seems to make a better mix, however, than plain rotary or spiral motion thereof.

It is sometimes desirable to add some chemical such as ferric chloride to the liquid in the tanks so we have found this can be conveniently done in our aeration tank by introducing it with the air. That is, a chemical either solids in solution or as a gas can be added to the air-stream at any desired point whereby the air will become the carrier of the chemical as it flows to and is emitted in the aerating tank. Similarly, we may heat the air in winter. Since the air is introduced on a volumetric basis, it is apparent that less power is consumed with heated air than with the heavier cold air.

The drawings and description herein have been given in an illustrative sense and not a limiting one, for obviously, the invention is capable of other embodiments without departing from the spirit and scope thereof. For instance, whereas we have described the treatment of sewage in our apparatus, other liquids such as trade-wastes, or water for purification, may be treated by our aerator.

We claim:

1. An apparatus for aerating sewage comprising a tank having two parallel sections, a dividing ridge between the sections, means for emitting an air stream from the upper portion of said ridge for supplying both sections, and paddle agitating means in each section, rotating inwardly toward each other and effective to deflect air downwardly from the point of air emission.

2. An apparatus for aerating sewage comprising a tank, means for emitting therein an air stream at a raised point intermediate of the top and bottom of the tank, and rotary paddle means for agitating air and sewage in the tank downwardly from the point of air emission, said paddle means arranged relative to the air emitting means in such a manner that the paddles will deflect the air stream downwardly and around the paddle axis through the sewage.

3. An apparatus for aerating sewage comprising a tank having two parallel sections, a dividing ridge between the sections, porous tiles forming the top of the ridge to emit an air stream therefrom for supplying both sections, paddle agitating means in each section, rotating inwardly toward each other and effective to deflect air downwardly from the point of air emission, and an air supply header arranged alongside said ridge and at an elevation intermediate the top of said ridge and the bottom of said tank.

4. An apparatus for aerating sewage comprising a tank having two units, a dividing ridge between the units, means for emitting an air stream from the upper portion of said ridge for supplying both units, and paddle agitating means in each unit, comprising a paddle shaft in each unit parallel to said ridge, and comprising paddles mounted upon each shaft, the paddles of one shaft being staggered relative to each other and to the oppositely located paddles of the other shaft.

5. An apparatus for aerating sewage comprising a tank having two parallel sections, a dividing ridge between the two sections, means for emitting an airstream from the upper portion of said ridge for supplying both sections, and paddle agitating means in each section, rotating inwardly toward each other and effective to deflect air downwardly from the point of air emission, the paddles of one shaft being staggered relative to the paddles of the other shaft so that the number of paddle impacts upon the rising airstream is twice the number of the paddle revolutions.

FRANK A. DOWNES.
ANTHONY J. FISCHER.
NELS B. LUND.